United States Patent
Wang et al.

(10) Patent No.: US 11,801,836 B2
(45) Date of Patent: Oct. 31, 2023

(54) ENHANCED VEHICLE OPERATION

(71) Applicant: Ford Global Technologies, LLC, Dearborn, MI (US)

(72) Inventors: Lijun Wang, Canton, MI (US); Chen Zhang, Dearborn, MI (US); Rebecca Kreucher, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 147 days.

(21) Appl. No.: 17/082,507

(22) Filed: Oct. 28, 2020

(65) Prior Publication Data

US 2022/0126826 A1 Apr. 28, 2022

(51) Int. Cl.
| | |
|---|---|
| *B60W 30/18* | (2012.01) |
| *B60W 40/105* | (2012.01) |
| *B60W 40/08* | (2012.01) |
| *G06N 3/08* | (2023.01) |
| *B60W 10/06* | (2006.01) |
| *G06F 18/23* | (2023.01) |

(52) U.S. Cl.
CPC ............ *B60W 30/18* (2013.01); *B60W 10/06* (2013.01); *B60W 40/08* (2013.01); *B60W 40/105* (2013.01); *G06F 18/23* (2023.01); *G06N 3/08* (2013.01); *B60W 2540/043* (2020.02); *B60W 2710/0666* (2013.01)

(58) Field of Classification Search
CPC ...... B60W 30/18; B60W 10/06; B60W 40/08; B60W 40/105; B60W 2540/043; B60W 2710/0666; G06K 9/6218; G06N 3/08; G05D 1/0221
See application file for complete search history.

(56) References Cited

U.S. PATENT DOCUMENTS

| | | | |
|---|---|---|---|
| 8,050,856 B2 | 11/2011 | Duty et al. | |
| 9,328,674 B2 | 5/2016 | Geveci et al. | |
| 9,361,272 B2 | 6/2016 | Syed et al. | |
| 9,650,934 B2 | 5/2017 | Pachner et al. | |
| 10,414,410 B2 | 9/2019 | Vijayakumar | |
| 10,852,150 B2 * | 12/2020 | Li | G06N 20/00 |

(Continued)

OTHER PUBLICATIONS

STIC Search Report (Year: 2023).*
Malikopoulos, Andreas A., et al., "A Learning Algorithm for Optimal Internal Combustion Engine Calibration in Real Time," Proceedings of the ASME 2007 International Design Engineering Technical Conferences & Computers and Information in Engineering Conference, Sep. 2007, 10 pages.

(Continued)

*Primary Examiner* — Thomas Ingram
*Assistant Examiner* — Faris Asim Shaikh
(74) *Attorney, Agent, or Firm* — Brandon Hicks; Bejin Bieneman PLC

(57) ABSTRACT

A computer includes a processor and a memory storing instructions executable by the processor to collect operation data of one or more components of a vehicle, input the collected operation data and previously stored operation data to a first machine learning program that assigns the collected operation data to one of a plurality of previously determined paths and outputs a target fuel consumption rate of the vehicle based on the assigned path, input the target fuel consumption rate and the collected operation data to a second machine learning program that outputs a plurality of operation settings of the one or more components to attain the target fuel consumption rate, and actuate the one or more components to attain the plurality of operation settings.

18 Claims, 7 Drawing Sheets

(56) References Cited

U.S. PATENT DOCUMENTS

| | | | |
|---|---|---|---|
| 2007/0294030 A1* | 12/2007 | Jones | G01C 21/26 |
| | | | 701/519 |
| 2011/0258044 A1* | 10/2011 | Kargupta | G06Q 30/0251 |
| | | | 705/14.49 |
| 2012/0022764 A1* | 1/2012 | Tang | B60W 50/0097 |
| | | | 701/102 |
| 2012/0259533 A1 | 10/2012 | Nicosia et al. | |
| 2017/0146362 A1* | 5/2017 | Bai | G01C 21/3492 |
| 2018/0362039 A1* | 12/2018 | Breuer | G01C 21/3469 |
| 2019/0017828 A1* | 1/2019 | Harish | H04W 4/38 |
| 2019/0205813 A1* | 7/2019 | Sharma | G06F 16/951 |
| 2021/0380108 A1* | 12/2021 | Iihoshi | B60W 50/0097 |
| 2022/0089086 A1* | 3/2022 | Burmistrov | A61B 5/7264 |
| 2022/0126826 A1* | 4/2022 | Wang | G06V 10/82 |
| 2022/0187089 A1* | 6/2022 | Leung | B60W 50/14 |

OTHER PUBLICATIONS

Malikopoulos, Andreas A., et al., "Real-Time Self-Learning Optimization of Diesel Engine Calibration," ResearchGate, vol. 131, Mar. 2009, 8 pages.

Turkson, Richard Fiifi, et al. "Artificial neural network applications in the calibration of spark-ignition engines: An overview," Engineering Science and Technology, an International Journal 19, 2016, 14 pages.

Zeng, Qiangqiang, et al., "Model Based Calibration for Improving Fuel Economy of a Turbocharged Diesel Engine," Thermal Science: Year 2018, vol. 22, No. 3, pp. 1259-1270.

Zhao, Jinxing, et al., "Fuel economy optimization of an Atkinson cycle engine using genetic algorithm," Applied Energy 105, 2013, 14 pages.

\* cited by examiner

ENHANCED VEHICLE OPERATION

BACKGROUND

Vehicles can be equipped with computing devices, networks, sensors and controllers to acquire data regarding the vehicle's environment and to operate the vehicle based on the data. Vehicle sensors can provide data concerning paths to be traveled in the vehicle's environment and fuel consumed to move the vehicle along the paths. Operation of the vehicle can rely upon acquiring accurate and timely data regarding vehicle fuel consumption while the vehicle is being operated on a roadway.

DETAILED DESCRIPTION

Figure 1:
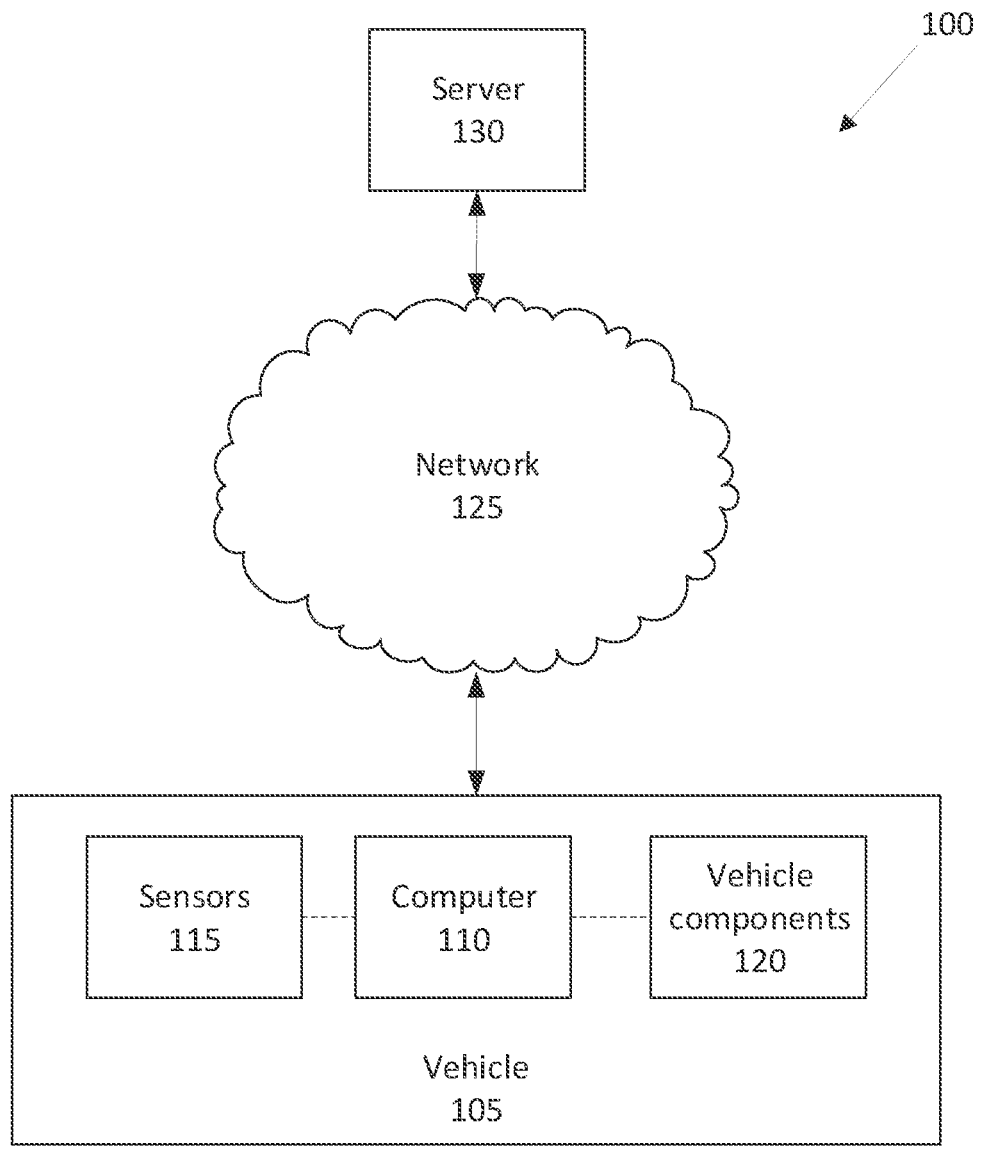
FIG. 1 is a diagram of an example system for operating a vehicle.

A system includes a computer including a processor and a memory, the memory storing instructions executable by the processor to collect operation data of one or more components of a vehicle, input the collected operation data and previously stored operation data to a first machine learning program that assigns the collected operation data to one of a plurality of previously determined paths and outputs a target fuel consumption rate of the vehicle based on the assigned path, input the target fuel consumption rate and the collected operation data to a second machine learning program that outputs a plurality of operation settings of the one or more components to attain the target fuel consumption rate, and actuate the one or more components to attain the plurality of operation settings.

The instructions can further include instructions to collect the operation data from a predetermined period of time from activation of the vehicle.

The instructions can further include instructions to identify an occupant of the vehicle based on the collected operation data.

The instructions can further include instructions to input the identification of an occupant of the vehicle to the first machine learning program and to output the target fuel consumption rate based on the identification of the occupant.

The instructions can further include instructions to input previously determined operation data of the vehicle operated by the identified occupant to the first machine learning program.

The instructions can further include instructions to input a planned path of the vehicle to the first machine learning program to output the target fuel consumption rate.

The instructions can further include instructions to input a trip vector to the first machine learning program, the trip vector being a set of values including a predicted path of the vehicle and one or more current operation settings for the components, and wherein the first machine learning program is a clustering program that assigns the trip vector to one of a plurality of clusters, each of the plurality of clusters is based on a respective previously determined trip vector.

Each previously determined trip vector defining the plurality of clusters can include an origin, a destination, and a path between the origin and the destination, and each previously determined trip vector can have at least one of a different destination or a different path from each other previously determined trip vector.

The instructions can further include instructions to input the collected operation data and previously stored operation data to a third machine learning program trained to output the trip vector.

The plurality of operation settings can include a prescribed torque output from a powertrain, and the instructions can further include instructions to actuate the powertrain to attain the prescribed torque output.

The plurality of operation settings can include a prescribed maximum speed, and the instructions can further include instruction to actuate at least one of a powertrain, a propulsion, or a brake to operate the vehicle below the prescribed maximum speed.

The instructions can further include instructions to input a current timestamp to the first machine learning program and to output the target fuel consumption rate based on the current timestamp.

A method includes collecting operation data of one or more components of a vehicle, inputting the collected operation data and previously stored operation data to a first machine learning program that assigns the collected operation data to one of a plurality of previously determined paths and outputs a target fuel consumption rate of the vehicle based on the assigned path, inputting the target fuel consumption rate and the collected operation data to a second machine learning program that outputs a plurality of operation settings of the one or more components to attain the target fuel consumption rate, and actuating the one or more components to attain the plurality of operation settings.

The method can further include collecting the operation data from a predetermined period of time from activation of the vehicle.

The method can further include identifying an occupant of the vehicle based on the collected operation data.

The method can further include inputting the identification of an occupant of the vehicle to the first machine learning program and outputting the target fuel consumption rate based on the identification of the occupant.

The method can further include inputting previously determined operation data of the vehicle operated by the identified occupant to the first machine learning program.

The method can further include inputting a planned path of the vehicle to the first machine learning program to output the target fuel consumption rate.

The method can further include inputting a trip vector to the first machine learning program, the trip vector being a set of values including a predicted path of the vehicle and one or more current operation settings for the components, and wherein the first machine learning program is a clustering program that assigns the trip vector to one of a plurality of clusters, each of the plurality of clusters is based on a respective previously determined trip vector.

The method can further include inputting the collected operation data and previously stored operation data to a third machine learning program trained to output the trip vector.

The plurality of operation settings can include a prescribed torque output from a powertrain, and the method can further include actuating the powertrain to attain the prescribed torque output.

The plurality of operation settings can include a prescribed maximum speed, and the method can further include actuating at least one of a powertrain, a propulsion, or a brake to operate the vehicle below the prescribed maximum speed.

The method can further include inputting a current timestamp to the first machine learning program and to output the target fuel consumption rate based on the current timestamp.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Operation of vehicle components can affect a fuel consumption rate of a vehicle. Matching calibration settings of the vehicle components to previously determined calibration settings can reduce fuel consumption when the vehicle follows a path similar to a previously driven path. That is, when a vehicle makes frequent trips that follow similar paths, determining calibration settings for vehicle components that reduced fuel consumption on a previous trip can reduce fuel consumption for future trips. Determining whether a current trip is similar to a previously determined trip and adjusting calibration settings to those of the previously determined trip can reduce fuel consumption for the current trip. Using data from a predetermined period of time upon initiating the trip and identifying data of a vehicle occupant, a computer of the vehicle can determine that the vehicle is following a similar path to a previous trip, and the computer can then operate the vehicle components according to calibration settings of the previous trip to reduce fuel consumption of the vehicle.

FIG. 1 illustrates an example system 100 for operating a vehicle 105. A computer 110 in the vehicle 105 is programmed to receive collected data from one or more sensors 115. For example, vehicle 105 data may include a location of the vehicle 105, data about an environment around a vehicle, data about an object outside the vehicle such as another vehicle, etc. A vehicle 105 location is typically provided in a conventional form, e.g., geo-coordinates such as latitude and longitude coordinates obtained via a navigation system that uses the Global Positioning System (GPS). Further examples of data can include measurements of vehicle 105 systems and components, e.g., a vehicle 105 velocity, a vehicle 105 trajectory, etc.

The computer 110 is generally programmed for communications on a vehicle 105 network, e.g., including a conventional vehicle 105 communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the vehicle 105), the computer 110 may transmit messages to various devices in a vehicle 105 and/or receive messages from the various devices, e.g., controllers, actuators, sensors, etc., including sensors 115. Alternatively or additionally, in cases where the computer 110 actually comprises multiple devices, the vehicle network may be used for communications between devices represented as the computer 110 in this disclosure. For example, the computer 110 can be a generic computer with a processor and memory as described above and/or may include a dedicated electronic circuit including an ASIC that is manufactured for a particular operation, e.g., an ASIC for processing sensor data and/or communicating the sensor data. In another example, computer 110 may include an FPGA (Field-Programmable Gate Array) which is an integrated circuit manufactured to be configurable by an occupant. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 110.

In addition, the computer 110 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The memory can be of any type, e.g., hard disk drives, solid state drives, servers, or any volatile or non-volatile media. The memory can store the collected data sent from the sensors 115. The memory can be a separate device from the computer 110, and the computer 110 can retrieve information stored by the memory via a network in the vehicle 105, e.g., over a CAN bus, a wireless network, etc. Alternatively or additionally, the memory can be part of the computer 110, e.g., as a memory of the computer 110.

Sensors 115 can include a variety of devices. For example, various controllers in a vehicle 105 may operate as sensors 115 to provide data via the vehicle 105 network or bus, e.g., data relating to vehicle speed, acceleration, location, subsystem and/or component status, etc. Further, other sensors 115 could include cameras, motion detectors, etc., i.e., sensors 115 to provide data for evaluating a position of a component, evaluating a slope of a roadway, etc. The sensors 115 could, without limitation, also include short range radar, long range radar, LIDAR, and/or ultrasonic transducers.

Collected data can include a variety of data collected in a vehicle 105. Examples of collected data are provided above, and moreover, data are generally collected using one or more sensors 115, and may additionally include data calculated therefrom in the computer 110, and/or at the server 130. In general, collected data may include any data that may be gathered by the sensors 115 and/or computed from such data.

The vehicle 105 can include a plurality of vehicle components 120. In this context, each vehicle component 120 includes one or more hardware components adapted to perform a mechanical function or operation-such as moving the vehicle 105, slowing or stopping the vehicle 105, steering the vehicle 105, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like. Components 120 can include computing devices, e.g., electronic control units (ECUs) or the like and/or computing devices such as described above with respect to the computer 110, and that likewise communicate via a vehicle 105 network.

A vehicle 105 can operate in one of a fully autonomous mode, a semiautonomous mode, or a non-autonomous mode. A fully autonomous mode is defined as one in which each of vehicle 105 propulsion (typically via a powertrain including an electric motor and/or internal combustion engine), braking, and steering are controlled by the computer 110. A semi-autonomous mode is one in which at least one of vehicle 105 propulsion (typically via a powertrain including an electric motor and/or internal combustion engine), braking, and steering are controlled at least partly by the computer 110 as opposed to a human operator. In a non-autonomous mode, i.e., a manual mode, the vehicle 105 propulsion, braking, and steering are controlled by the human operator.

The system 100 can further include a network 125 connected to a server 130. The computer 110 can further be programmed to communicate with one or more remote sites such as the server 130, via the network 125, such remote site possibly including a processor and a memory. The network 125 represents one or more mechanisms by which a vehicle computer 110 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
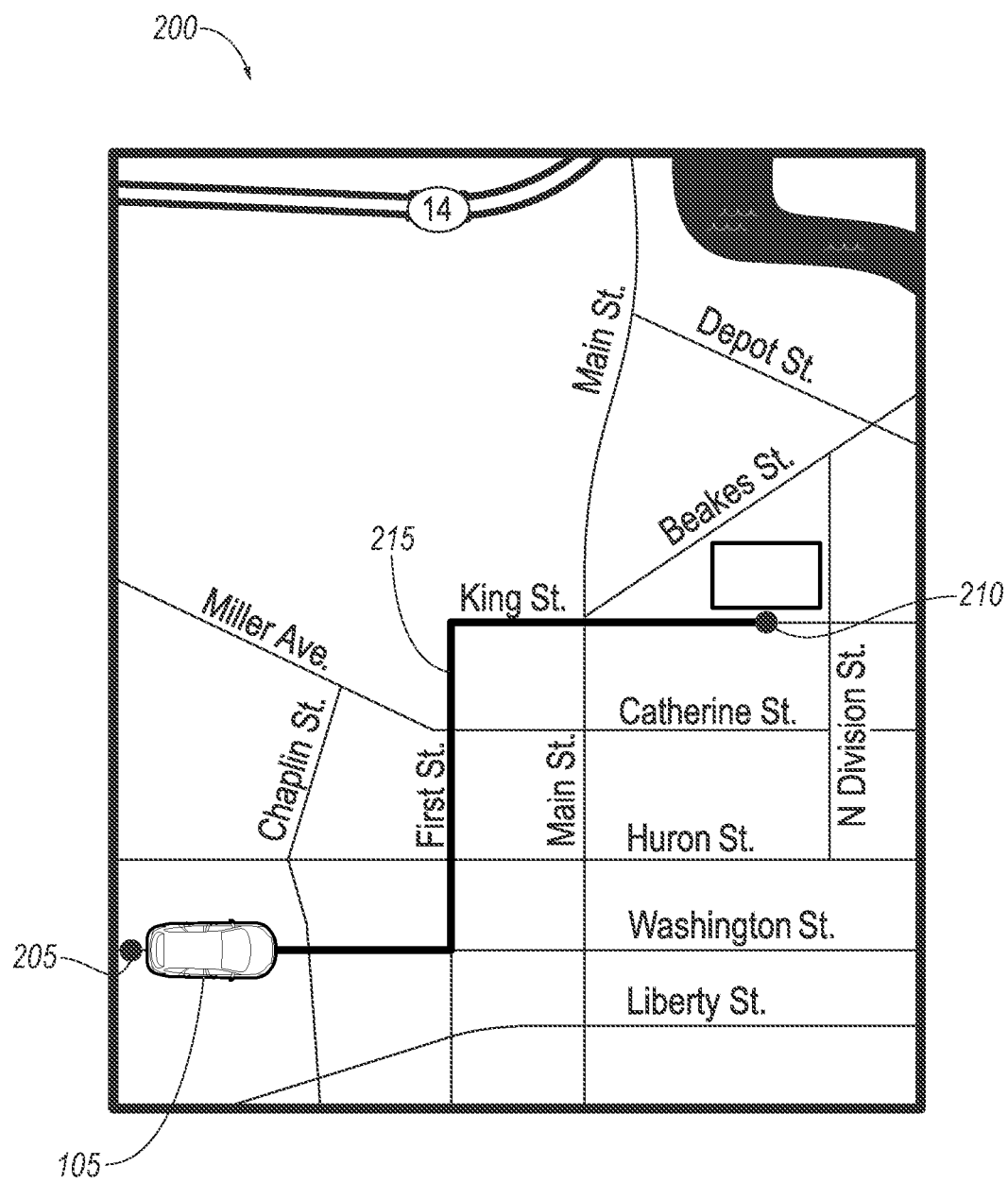
FIG. 2 is a view of an example trip taken by the vehicle.

FIG. 2 is a view of an example trip 200 followed by a vehicle 105. In this context, a "trip" is a period of time defined from the vehicle 105 leaving an origin 205 and arriving at a destination 210. The "origin" 205 is typically a location at which the vehicle 105 was activated. The "destination" 210 is a location at which the vehicle 105 is planned to deactivate, e.g., a location at which an occupant intends to go. The computer 110 can determine the locations of the origin 205 and the destination 210 as geo-coordinates from a global position system (GPS) server. Data collected on the trip 200 can include data collected from when the vehicle 105 leaves the origin 205 until the vehicle 105 arrives at the destination 210.

The trip 200 can include, i.e., begin upon, activation of the vehicle 105 to deactivation of the vehicle 105. "Activation" of the vehicle 105 begins upon receiving an instruction to enable mobility of the vehicle 105 from, e.g., a key, a fob, an instruction from a portable device, etc. That is, the trip 200 is includes operation of the vehicle 105 from activation to deactivation.

The trip 200 can include a path 215 from the origin 205 to the destination 210. The path 215 is a set of geo-coordinates that the vehicle 105 can follow to move from the origin 205 to the destination 210. The computer 110 can determine the path 215 using a path planning program, e.g., a path polynomial. The path polynomial p(x) is a model that predicts the path 215 as a line traced by a polynomial equation. The path polynomial p(x) predicts the path 215 for a predetermined upcoming distance x, e.g., measured in meters:

$$p(x) = a_0 + a_1 x + a_2 x^2 + a_3 x^3 \quad (1)$$

where $a_0$ an offset, i.e., a lateral distance between the path 215 and a center line of the vehicle 105 at the upcoming distance x, $a_1$ is a heading angle of the path 215, $a_2$ is the curvature of the path 215, and $a_3$ is the curvature rate of the path 215. In the present context, the "upcoming distance" x is a predetermined longitudinal distance in front of the host vehicle 101 from a front bumper of the vehicle 105 at which the sensors 115 collect data and the path planner predicts the path. The upcoming distance x can be determined based on, e.g., a current speed of the vehicle 105, a predetermined time threshold, determined based on empirical simulation data, a detection range of the sensors 115, etc. The time threshold can be, e.g., 1 second. The path polynomial can include one or more Bezier curves, i.e., polynomial functions that each represent a disjoint subset of points representing the path, and that taken together, represent the entire set of points representing the path. Bezier curves can be constrained to be continuously differentiable and have constraints or limits on the permitted derivatives, e.g. limits on the rates of change, with no discontinuities. Bezier curves can also be constrained to match derivatives with other Bezier curves at boundaries, providing smooth transitions between subsets. Constraints on Bezier curves can make a vehicle path polynomial a steerable path polynomial by limiting the rates of longitudinal and lateral accelerations required to pilot a vehicle 105 along the path polynomial, where braking torque and powertrain torque are applied as positive and negative longitudinal accelerations and clockwise and counter clockwise steering torque are applied as left and right lateral accelerations.

The computer 110 can collect operation data of one or more components 120 from one or more sensors 115 during the trip 200. In this context, "operation data" are data describing operation of the components 120. The operation data can include, e.g., speed data, acceleration data, braking data, fuel level data, steering angle data, tire pressure data, etc. That is, as the computer 110 actuates components 120 along the trip 200, the operation data describe how the vehicle 105 operates on the trip 200.

Figure 3:
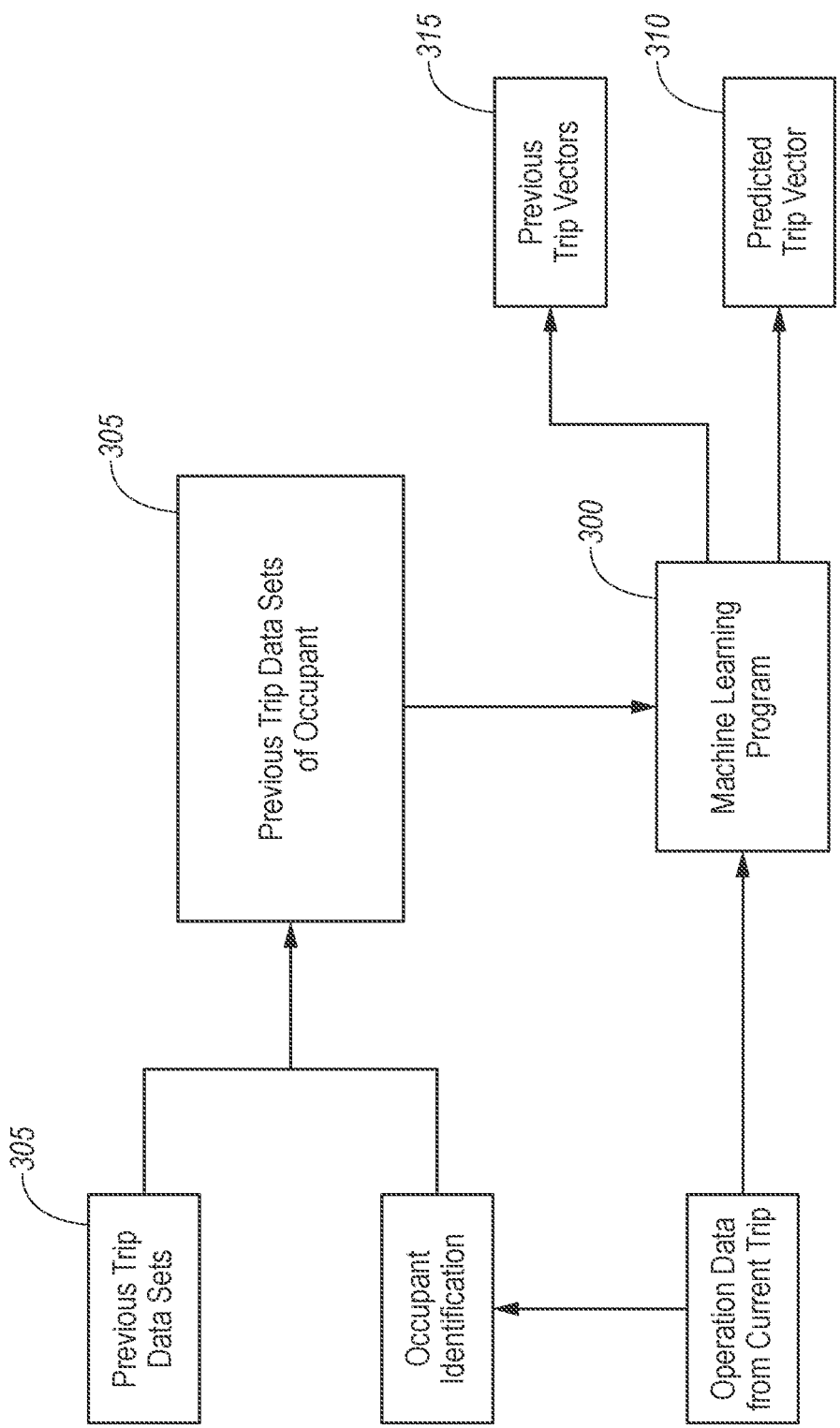
FIG. 3 is a diagram of an example machine learning program to identify a trip vector.

FIG. 3 is a diagram illustrating a machine learning program 300 that uses previously determined trip data sets 305 and an initial trip data set as input to predict a trip vector 310 describing the current trip 200 and to determine previous trip vectors 315 for previous trips. A "trip data set" is a list or array of sets of operation data describing a trip 200, such as shown in expression (2) below. A previously determined trip data set 305 is a list or array of operation data describing a previous trip 200. An "initial" trip data set 305 is a predetermined list or array of operation data determined by a manufacturer based on test trip 200 data collected during empirical tests of test vehicles 105. That is, as vehicles 105 travel on trips 200, the vehicles 105 transmit operation data to a server 130, and the server 130 generates a plurality of initial trip data sets 305 representing frequently-traveled trips 200.

$$T = [l_o \; l_d \; t \; p(x) \tau \ldots FC \; v \; W \; C \; A \; ID] \quad (2)$$

where T is the trip data set 305, $l_o$ is the origin 205, represented as a pair of geo-coordinates, $l_d$ is the destination 210, represented as a pair of geo-coordinates, t is an array of timestamps at which the sensors 115 collected data on the trip 200, p(x) is the path 215, represented as a set of geo-coordinates collected at each timestamp t, r is an array of torque outputs of a powertrain collected at each timestamp t, FC is a fuel consumption rate of the trip 200 that is an amount of fuel consumed in milliliters per meter, v is an array of vehicle speeds collected at each timestamp t, W is a weather indicator value, as described below, that categorizes weather data at each timestep t, C is a traffic congestion indicator value that categorizes traffic data at each timestep t, A is an occupant aggressiveness indicator value that categorizes the occupant's steering and acceleration of the vehicle 105 at each timestep t, and ID is an identification of the occupant, e.g., an occupant ID number associated with the vehicle 105, an occupant name, an occupant phone number, etc. The trip data set 305 can include additional data not shown in this example, as noted with the ellipses in the vector T above. For example, the trip data set 305 can include road condition data, e.g., road grade, a road friction coefficient, presence of potholes, etc.

As described above, the trip data set 305 can include one or more indicator values that classify environmental and occupant data about the trip 200. In this context, an "indicator value" is a numerical value that indicates a specific type of environmental or occupant data. For example, a weather indicator value W can be one of a plurality of integers, each integer representing a specific type of weather data identified by the computer 110, e.g., the computer 110 can assign a weather indicator value W of 0 upon detecting no clouds or precipitation (i.e., clear weather) with an ambient temperature above 0° C. and an anti-lock brake subsystem and a traction control subsystem disabled, a value of 1 upon detecting clouds but no precipitation, a value of 2 upon detecting rain precipitation and one of the anti-lock brake subsystem or the traction control subsystem enabled, a value of 3 upon detecting snow precipitation, etc. For each timestep t, the computer 110 can assign the weather indicator value W based on data collected from, e.g., a precipitation sensor. Alternatively, the weather indicator value W can be a binary value, e.g., the computer 110 can assign a weather indicator value W of 0 when data from a precipitation sensor indicate that a precipitation level is below a predetermined threshold determined by empirical testing and data from previous trip data sets 305, and the computer 110 can assign a weather indicator value W of 1 when data from the precipitation sensor indicate that the precipitation level is above the predetermined threshold.

In another example, a traffic congestion indicator value C can be one of a plurality of integers, each integer representing a specific type of traffic based on a current speed of the vehicle 105 and a number of other vehicles 105 near the vehicle 105. For example, the computer 110 can assign a traffic congestion indicator value C of 0 when the speed of the vehicle 105 is at least a posted speed limit, there are no other vehicles 105 within a distance threshold of the vehicle 105 (i.e., no traffic), or a number of vehicles 105 that pass an infrastructure sensor for a specified period of time (i.e., a traffic rate) is above a traffic threshold, a value of 1 when the speed of the vehicle 105 is at least the posted speed limit and there is at least one vehicle 105 within the distance threshold of the vehicle 105 (i.e., light traffic), and a value of 2 when the speed of the vehicle 105 is below the posted speed limit and there are two or more vehicles 105 within the distance threshold of the vehicle 105 (i.e., heavy traffic). The distance threshold can be a length of a typical vehicle 105, e.g., 10 feet. The computer 110 can collect data of one or more other vehicles 105, e.g., image data collected with a camera, a data point cloud collected with a lidar, radio wave data collected with a radar, etc. Upon collecting the data, the computer 110 can use a conventional object-detection algorithm to detect the other vehicles 105, e.g., image segmentation, Canny edge detection, a deep learning network, etc. Alternatively, the traffic congestion indicator value C can be a binary value, e.g., the computer 110 can receive data from an infrastructure sensor that outputs a number of vehicles 105 that pass the infrastructure sensor for a specified time period, i.e., a traffic rate. If the traffic rate is below a predetermined threshold, the computer 110 can output a traffic congestion indicator value C of 0, and if the traffic rate is above the predetermined threshold, the computer 110 can output a traffic congestion indicator value C of 1. The predetermined threshold can be determined based on, e.g., empirical testing of vehicles 105 and data from infrastructure sensors and data from previously determined trip data sets 305.

In another example, an occupant aggressiveness indicator value A can be one of a plurality of integers, each integer representing specific behavior of the occupant operating the vehicle 105. For example, the computer 110 can assign an occupant aggression indicator value A of 0 when a change of a steering wheel angle between two successive timestamps t is below a predetermined threshold (indicating that the occupant is not swerving), the predetermined threshold determined being a change of a steering wheel angle that would cause the vehicle 105 to move into an adjacent roadway lane at the next timestep t, or a rate of change of a throttle is below a predetermined threshold. The computer 110 can assign an occupant aggression indicator value A of 1 when a change of the steering wheel angle between two successive timestamps t is above the threshold or the rate of change of the throttle is above the threshold. The respective thresholds for the change in steering wheel angle and the rate of change of the throttle can be determined based on previous trip data sets 305. That is, the computer 110 and/or the server 130 can list the changes in steering wheel angle and the rates of change of the throttle for a plurality of previous trip data sets 305 and can identify a value at a specified percentile as the respective threshold. For example, the occupant aggressiveness indicator value A can start at 0 and can increment by 1 when a current change in a steering wheel angle exceeds respective values of the $10^{th}$, $25^{th}$, $50^{th}$, $75^{th}$, and $90^{th}$ percentiles of the steering wheel angle data in the previous trip data sets. Additionally or alternatively. the occupant aggressiveness indicator value A can increment by 1 when a current change in a rate of change of a throttle exceeds respective values of the $10^{th}$, $25^{th}$, $50^{th}$, $75^{th}$, and $90^{th}$ percentiles of the rate of change of the throttle. That is, the occupant aggressiveness indicator value A can be an integer value between 0 and 10 that is based on a current change in a steering wheel angle, a current rate of change of a throttle, and the previous trip data sets 305.

The computer 110 and/or the server 130 can predict a trip vector 310 for the vehicle 105 on a current trip 200 and can output previously trip vectors 315 for previous trips 200. A "trip vector" is a list or array of numerical values output by the machine learning program 300, each value representing certain types of operation data. That is, the predicted trip vector 310 is a trip vector for a current trip based on the operation data, and the previous trip vectors 315 are trip vectors for the previous trip data sets 305. The entries in the trip vectors 310, 315 can each be a single value for a specific type of operation data, e.g., an average of the set of operation data in the trip data set 305. For example, the trip data set 305 can include an array of speed values v for a previous trip 200, and the previous trip vector 315 for that trip 200 can include a single value for the speed v that is an arithmetic mean of the array of speed values v in the trip data set 305. Each entry in the trip vectors 310, 315 could also be a value representing a specific combination of more than one type of data of the trip 200 as determined by the machine learning program 300. For example, one entry of one of the trip vectors 310, 315 can be a numerical value that combines vehicle speed data with total trip duration data and time duration data during which the vehicle speed exceeded a threshold, i.e., a "speed trace." The numerical value assigned to the speed trade for the trip vector 310, 315 can indicate that one of the trips 200 has a longer and higher vehicle speed trace than another trip 200. For example, the trip vector 310, 315 can include a value of 1.0 representing a speed trace indicating that the vehicle 105 performed a trip 200 that elapsed longer than 30 minutes during which the vehicle speed exceeded 65 miles per hour (mph) for more than 80% of the trip duration. In another example, the trip vector 310, 315 can include a value of 0.05 representing a speed trace indicating that the vehicle 105 performed a trip 200 that elapsed longer than 30 minutes during which the vehicle speed remained below 45 mph for more than 80% of the trip duration. The computer 110 can use the predicted trip vector 310 to actuate components 120 according to specified operation settings, as described below, to maintain a specified fuel consumption rate. That is, based on previous trip data sets 305 for trips 200 that the occupant has taken with the vehicle 105, the computer 110 can predict that the vehicle 105 is currently on a trip 200 similar to one of the previous trips 200. For example, the current trip 200 may have a same origin 205 and a same destination 210 as a previous trip 200. The computer 110 can use data from the trip data sets 305 of the previous trip to actuate components 120 during the current trip 200. For example, the data from the previous trip data sets 305 can indicate specified actuation of the components 120 to reach the destination 210.

The computer 110 can identify an occupant of the vehicle 105 based on the collected operation data. That is, each trip 200 and corresponding trip data set 305 can include an identification of the occupant that performed the trip 200, and when the collected operation data indicate that the vehicle 105 may be on a trip 200 performed by a specific occupant, the computer 110 can identify the occupant of the vehicle 105. For example, if the destination 210 provided to the computer 110 is included only in trip data sets 305 of a single occupant of the vehicle 105, the computer 110 can identify that single occupant as the current occupant of the vehicle 105. In another example, the computer 110 can compare a current location of the vehicle 105 to a current timestamp to respective locations of the vehicle 105 at similar timestamps, and the computer 110 can identify trip data sets 305 in which location data are within a distance threshold of the current location at timestamps within a time threshold of the current timestamp. The distance threshold and the time threshold can be predetermined values based on collected trip data sets 305 from a single vehicle 105, e.g., trip data sets 305 for daily or weekly routine trips 200. The distance threshold can be a maximum distance between location data in the trip data sets 305 for routine trips 200 having a same origin 205 and a same destination 210, and the time threshold can be a maximum time difference between respective times that the vehicle 105 leaves the origin 205 in each trip data set 305. Thus, the computer 110 can predict the trip vector 310 and determine the previous trip vectors 315 based on the previous trip data sets 305 of the identified occupant. Alternatively or additionally, the computer 110 can identify the occupant of the vehicle 105 using some other mechanism for identification, e.g., biometric data, image data, input to a human-machine interface (HMI), communication with a portable device of the occupant, etc. For example, the computer 110 can collect an image of the occupant, compare the image of the occupant to stored images of occupants of the vehicle 105 with a conventional image processing technique such as Canny edge detection, and identify the occupant when the collected image matches one of the stored images.

The computer 110 can collect operation data for a predetermined period of time from activation of the vehicle 105. The predetermined period of time can be determined as a minimum amount of time to collect data to identify the previous trip vector 305 and/or the occupant. That is, the predetermined period of time can be determined by performing empirical testing that includes comparing operation data collected during each of a plurality of specified periods of time a plurality of trip vectors 305 from each of a plurality of occupants, and the predetermined period of time can be the smallest specified period of time at which the collected operation data match trip vectors 305 of only one occupant. For example, the predetermined period of time can be 10 seconds. By collecting operation data for the predetermined period of time, the computer 110 and/or the server 130 can predict a trip vector 310 for the current trip 200 and actuate components 120 according to the predicted trip vector 310.

The computer 110 and/or the server 130 can input the identification of the occupant and the collected operation data to a machine learning program 300 to predict the trip vector 310 for the current trip 200 and to output previous trip vectors 315 from previous trips 200. The machine learning program 300 can be, e.g., a deep neural network, a convolutional neural network, etc., such as a neural network shown in FIG. 5. The machine learning program 300 can receive as input the occupant identification, the collected operation data, and the initial trip data set 305 described above, and can output the predicted trip vector 310 and the previous trip vectors 315. That is, the machine learning program 300 can be trained to predict a trip vector 310 for the current trip 200 that is similar to previously determined trip vectors 315 for the identified occupant.

Figure 4:
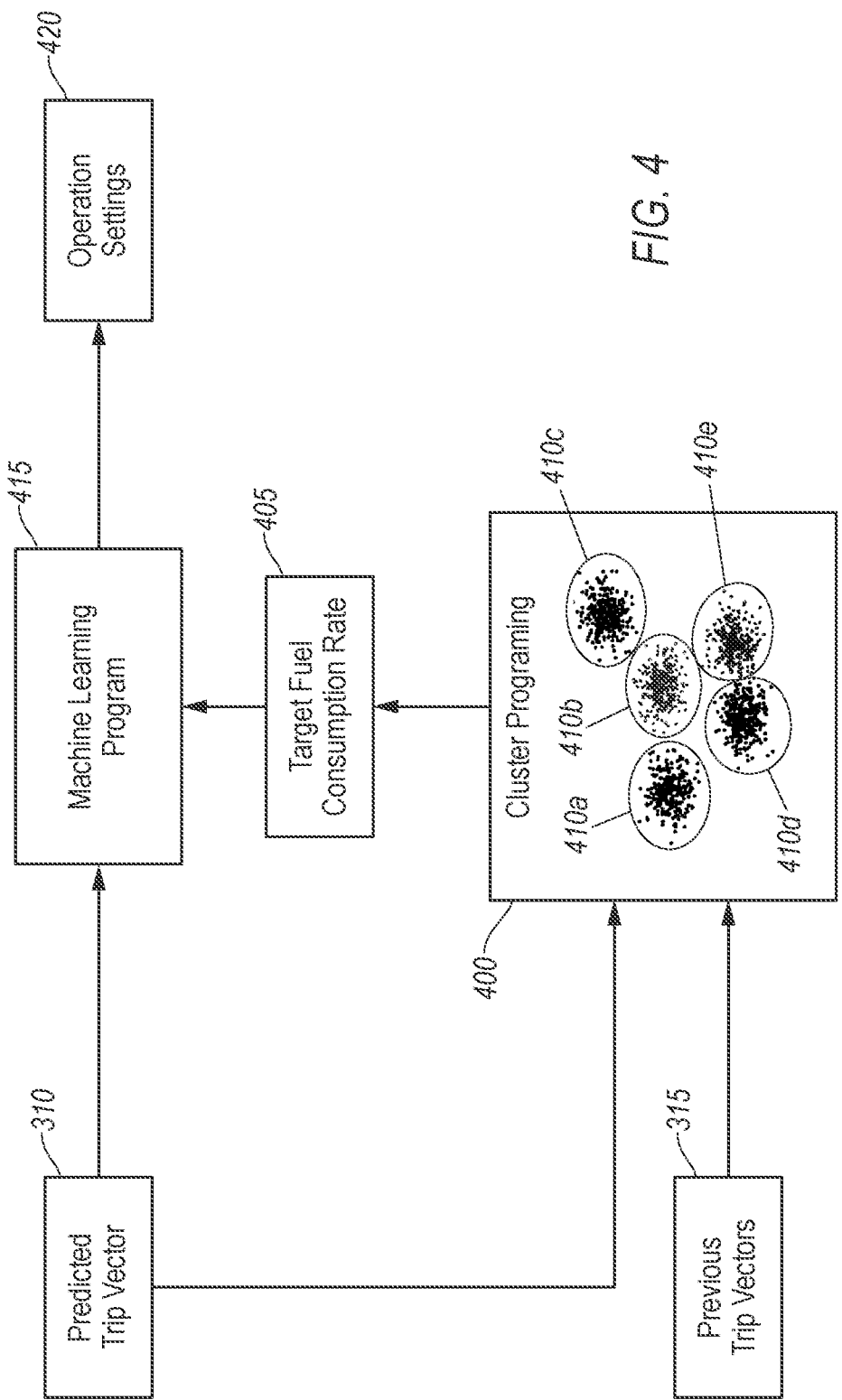
FIG. 4 is a diagram of an example machine learning program to identify operation settings for the vehicle.

FIG. 4 is a diagram illustrating a clustering program 400 to determine a target fuel consumption rate and a machine learning program 415 to determine operation settings for vehicle components 120. Upon determining the predicted trip vector 310 for the current trip 200, the computer 110 can determine a target fuel consumption rate 405 for the trip 200. As described above, the "fuel consumption rate" is a rate of fuel consumption, i.e., the amount of fuel consumed by the vehicle 105 divided by the distance traveled on the trip 200. A "target" fuel consumption rate is a specified fuel consumption rate for the trip 200 that the vehicle computer 110 actuates components 120 to attain. That is, the computer 110 actuates the components 120 according to specified operation settings, as described below, to consume fuel at a specified rate to attain the target fuel consumption rate 405.

The computer 110 can input the predicted trip vector 310 to a clustering program 400 to determine the target fuel consumption rate 405. A "clustering program" 400 is a machine learning program that assigns an input to one of a plurality of "clusters" 410 based on a difference between values in the input and values in each cluster. That is, a "cluster" is a set of data that have values within a specified threshold of each other. The clustering program 400 can be a conventional program that uses a clustering technique, e.g., K-means, agglomerative hierarchical clustering (e.g., Ward, Single-linkage, Complete linkage, etc.), density-based clustering (e.g., DBSCAN), etc. Each clustering program 400 identifies a distance between an input and each cluster 410. The "distance" is an output of a distance function, e.g., a Euclidean distance function, a Mahalanobis distance function, etc. The clustering program 400 then determines a cluster 410 to which to assign the input. For example, the clustering program 400 can assign the cluster 410 based on whether the smallest distance between the input and each cluster 410 is above a threshold. If the smallest distance is above the threshold, the clustering program 400 identifies anew cluster 410 and assigns the input to the new cluster 410. If the smallest distance is below the threshold, the clustering program 400 assigns the input to the cluster 410 having the smallest distance to the input.

In the example of FIG. 4, the values in a cluster 410 can be trip vectors 315 that have a same origin 205 and a same destination 210. FIG. 4 shows five clusters 410*a*, 410*b*, 410*c*, 410*d*, 410*e* to which the clustering program 400 can assign an input, and the clustering program 400 can identify a different number of clusters 410, e.g., four, six, etc. Each of the clusters 410*a*-410*e* can represent a different path that the vehicle 110 has traveled on previous trips 200. That is, each point in a cluster 410 represents a specific trip 200 from a specific origin 205 to a specific destination 210, and each cluster 410 includes the plurality of trip vectors 315 that share a common origin 205 and a common destination 210. The clustering program 400 can be trained by inputting a plurality of reference trip vectors 315 annotated with a specified cluster 410 and reducing a Euclidean distance function between the input reference trip vectors 315 and the trip vector 315 defining the specified cluster 410.

The target fuel consumption rate 405 is based on the respective fuel economies of the previous trip vectors 315 in each cluster 410. For example, the computer 110 can generate a cumulative distribution function of the fuel economies using conventional statistical methods. The cumulative distribution function receives as input a specified fuel consumption rate threshold and outputs a probability (i.e., a value between 0 and 1) that the trip data sets 305 in the cluster 410 have a fuel consumption rate 405 below the specified fuel consumption rate threshold. That is, the cumulative distribution function indicates the probability that the trip data sets 305 in the cluster 410 would have a fuel consumption rate value below the specified fuel consumption rate threshold. The target fuel consumption rate 405 can be the specified fuel consumption rate threshold that outputs a specified probability, e.g., 0.9, the probability specified by a manufacturer such that an input trip vector 310 would be assigned by the clustering program 400 to only one of the plurality of clusters 410.

As an alternative or in addition to the predicted trip vector 310, the computer 110 can input data used to generate the predicted trip vector 310 to the clustering program 400 to output the target fuel consumption rate 405. That is, the computer 110 can input, e.g., a planned path of the vehicle, the collected operation data, the previously stored operation data, a current timestamp, the identification of the occupant, etc., to the clustering program 400. Using the data that generated the predicted trip vector 310 in addition to the predicted trip vector 310 can cause the clustering program 400 to more accurately assign the cluster 410 than using the predicted trip vector 310 alone. That is, if the predicted trip vector 310 could be assigned to one of the clusters 410, the clustering program 400 can use the input data to determine which of the clusters 410 to assign to the predicted trip vector 310.

The computer 110 can input the predicted trip vector 310 and the target fuel consumption rate 405 into a machine learning program 415 that outputs a plurality of operation settings 420 to attain the target fuel consumption rate 405. In this context, "operation settings" are specified settings for each of a plurality of components 120. That is, the computer 110 actuates each component 120 within ranges of values specified by the operation settings 420. The operation settings 420 can include, e.g., a prescribed torque output from a powertrain, a prescribed maximum speed, a prescribed maximum throttle input, a prescribed path to follow to the destination 210, etc., as shown in Table 1 below:

TABLE 1

| | Operation Settings | | |
|---|---|---|---|
| Set | Maximum Torque Output | Engine Speed | Maximum Speed |
| 1 | 100% | 1200-2500 rpm | 100 kph |
| 2 | 80% | 2000-4000 rpm | 120 kph |
| 3 | 70% | <1500 rpm | 70 kph |
| 4 | 60% | 1000-2000 rpm | 60 kph |
| 5 | 100% | N/A | N/A |
| Set | Maximum Throttle Input | Hybrid Engine Transition Time | Rear HVAC/Heated Seats/Cooled Seats |
| 1 | 100% | 15 minutes | Enabled |
| 2 | 100% | N/A | Enabled |
| 3 | 50% | 20 minutes | Enabled |
| 4 | 50% | 25 minutes | Enabled |
| 5 | 100% | N/A | Disabled |

That is, a first set of operation settings 420 (set 1 above) can be for trips 200 of a commute between an occupant's home and an occupant's workplace, including travel on a highway that can have a higher maximum speed than a city or suburban roadway. In the first set of operation settings 420, the maximum speed can be selected to the speed limit of the highway and the hybrid engine transition time can be an average time for the vehicle 105 to reach the highway from the origin 205. That is, on the highway, the computer 110 can determine to operate a hybrid propulsion in a gasoline mode and suppress battery operation of the hybrid propulsion, and, after the hybrid engine transition time elapses from initiation of the trip 200, the computer 110 can transition the hybrid propulsion to the gasoline mode to operate the vehicle 105 on the highway.

Each set of operation settings 420 can be determined for specific types of trips 200. For example, set 2 can specify operation settings 420 for trips with few stops and low gradients, allowing for continuous, fast travel of the vehicle 105 relative to other trips 200. Set 3 can specify operation settings 420 for trips with long idle events, e.g., heavy traffic, in which the hybrid propulsion should operate longer in an electric mode than for other types of trips 200 and the maximum speed typically attained can be lower than a posted speed limit. Set 4 can specify operation settings 420 for trips that include frequent stops, e.g., on urban or suburban roadways with more stop signs and stop lights than a highway, in which the maximum throttle input should be lower than for other trips to reduce fuel consumption. Set 5 can specify operation settings 420 for a vehicle 105 with no occupants other than a driver, and the operation settings 420 can include deactivating HVAC vents and heated/cooled seats in rear seats because no occupants would use these features.

The computer 110 can actuate the components 120 to operate within ranges prescribed by the operation settings 420, e.g., the computer 110 can actuate a propulsion 120 to maintain a speed of the vehicle 105 below the prescribed maximum speed, the computer 110 can actuate a steering to maintain a location of the vehicle 105 within a distance threshold of the prescribed path, etc.

Because the operation settings 420 are determined by inputting the predicted trip vector 310 to the machine learning program 415, the operation settings 420 account for data included in the trip vector 310. For example, the predicted trip vector 310 can include predicted weather data values W, as described above, and the operation settings 420 can include settings that would maintain the target fuel consumption rate 405 in the predicted weather data values W, e.g., the operation settings 420 can include a prescribed maximum speed that can prevent slipping of tires relative to the roadway. In another example, the predicted trip vector 310 can include road condition data (e.g., binary data values indicating a road is or is not gravel, is or is not paved, is or is not icy, etc.), and the operation settings can include a prescribed steering input to avoid certain portions of the roadway, e.g. a portion of a roadway with loose gravel. Thus, the machine learning program 415 can be trained to output the operation settings 420 based on the data in the predicted trip vector 310.

The machine learning program 415 can be, e.g., a deep neural network as described in FIG. 5 below, a convolutional neural network, etc. That is, the machine learning program 415 can receive as input the target fuel consumption rate 405 and the predicted trip vector 310 and can output the operation settings 420 to attain the target fuel consumption rate 405. The machine learning program 415 can be trained with reference trip vectors 305 annotated with a reference fuel consumption rate 405 and specified operation settings 420. A cost function of the machine learning program 415 can be minimized as described below such that a trip vector 305 with no annotations and an input target fuel consumption rate can be input to the machine learning program 415 and the machine learning program 415 can output calibration settings 420 for vehicle components 120 to attain the target fuel consumption rate 405.

Figure 5:
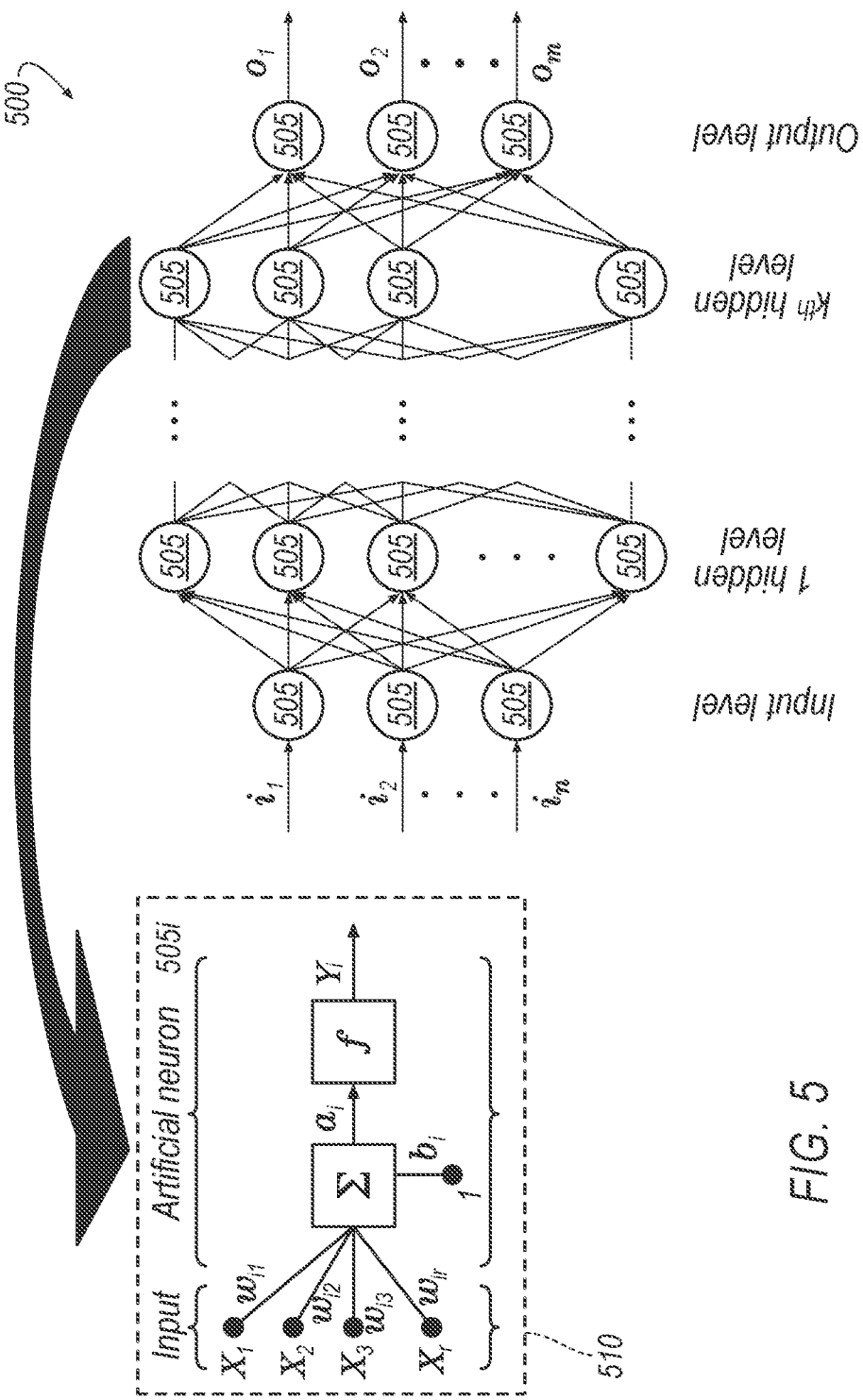
FIG. 5 is a diagram of an example neural network.

FIG. 5 is a diagram of an example a deep neural network (DNN) 500. The machine learning programs 300, 415 described above may be deep neural networks such as the DNN 500. That is, the machine learning programs 300, 415 may be trained according to the conventional deep learning techniques described below.

The DNN 500 can be a software program that can be loaded in memory and executed by a processor included in the server 130, for example. The DNN 500 can include n input nodes 505, each accepting a set of inputs i (i.e., each set of inputs i can include one or more inputs X). The DNN 500 can include m output nodes (where m and n may be, but typically are not, a same natural number) provide sets of outputs $o_1 \ldots o_m$. The DNN 500 includes a plurality of layers, including a number k of hidden layers, each layer including one or more nodes 505. The nodes 505 are sometimes referred to as artificial neurons 505, because they are designed to emulate biological, e.g., human, neurons. The neuron block 510 illustrates inputs to and processing in an example artificial neuron 505$i$. A set of inputs $X_1 \ldots X_r$ to each neuron 505 are each multiplied by respective weights $w_{i1} \ldots w_{ir}$, the weighted inputs then being summed in input function $\Sigma$ to provide, possibly adjusted by a bias $b_i$, net input $a_i$, which is then provided to activation function $f$, which in turn provides neuron 505$i$ output $Y_i$. The activation function $f$ can be a variety of suitable functions, typically selected based on empirical analysis. As illustrated by the arrows in FIG. 5, neuron 505 outputs can then be provided for inclusion in a set of inputs to one or more neurons 505 in a next layer.

The DNN 500 can be trained to accept as input data, e.g., operation data from the vehicle 105 and an identification of an occupant operating the vehicle 105, and to output the predicted trip vector 310. That is, the DNN 500 can be trained with ground truth data, i.e., data about a real-world condition or state. Weights w can be initialized by using a Gaussian distribution, for example, and a bias b for each node 505 can be set to zero. Training the DNN 500 can including updating weights and biases via conventional techniques such as back-propagation with optimizations.

A set of weights w for a node 505 together are a weight vector for the node 505. Weight vectors for respective nodes 505 in a same layer of the DNN 500 can be combined to form a weight matrix for the layer. Bias values b for respective nodes 505 in a same layer of the DNN 500 can be combined to form a bias vector for the layer. The weight matrix for each layer and bias vector for each layer can then be used in the trained DNN 500.

In the present context, the ground truth data used to train the DNN 500 could include previous trip data sets 305. For example, a computer 110 can use data from a plurality of previously determined trip data sets 305 that can be labeled for training the DNN 500, i.e., the initial trip data set 305 based on route and traffic can be specified identifying the trip data sets 305 to which the operation data belong. The DNN 500 can then be trained to take both a real trip data set 305 and an initial trip data set 305 to transform to output data trip vector 310, and the output data values can be compared to the annotations to identify a difference, i.e., a cost function of the output trip vector 310 and an initial trip data set 305. The weights w and biases b can be adjusted to reduce the output of the cost function, i.e., to minimize the difference between the output trip vector 310 and an initial trip data set 305. When the cost function is minimized, the server 130 can determine that the DNN 500 is trained.

Figure 6:
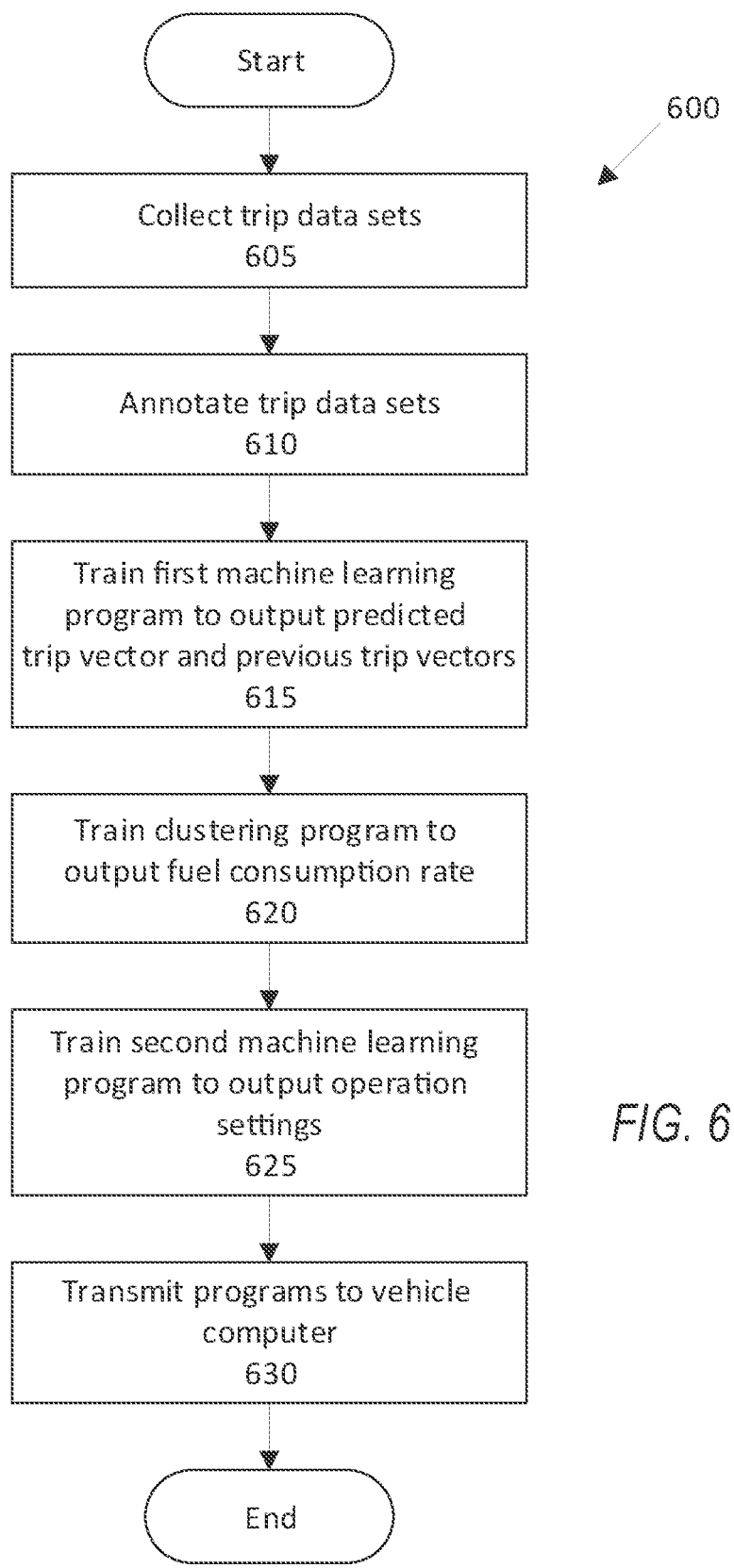
FIG. 6 is a diagram of an example process for programming a vehicle computer with machine learning programs.

FIG. 6 is a diagram of an example process 600 for training machine learning and clustering programs, such as those described above, and providing them to a computer 110 of a vehicle 105. The process 600 begins in a block 605, in which a server 130 collects a plurality of trip data sets 305. As described above, a trip data set 305 is a list or array of operation data describing a trip 200 that a vehicle 105 takes. The server 130 can collect the trip data sets 305 from, e.g., a plurality of vehicles 105.

Next, in a block 610, the server 130 annotates the trip data sets 305 for training one or more machine learning programs. As described above, the trip vectors 305 can be annotated with ground truth data, i.e., data of a real-world condition or state. For example, each trip vector 305 can include annotations indicating a fuel consumption rate 405 and a set of operation settings 420 for components 120 of the vehicle 105 on the trip 200.

Next, in a block 615, the server 130 trains a first machine learning program 300 to output a predicted trip vector 310 for a reference trip data sets 305 and a plurality of trip vectors 315 of previous trip data sets 305. As described above, the first machine learning program 300 can be a neural network such as the DNN 500. The server 130 can train the first machine learning program 300 with the annotated trip data sets 305 and reference operation data to output the trip vectors 310, 315 from the input operation data.

Next, in a block 620, the server 130 trains a clustering program 400 to output a target fuel consumption rate 405. As described above, the server 130 can input the trip vectors 310, 315 to the clustering program 400, and the clustering program 400 can assign a cluster 410 to each trip vector 310, 315 based on a Euclidean distance between each trip vector 310, 315. When the Euclidean distance between two trip vectors 310, 315 is above a distance threshold, the clustering program 400 can assign each trip vector 310, 315 to different cluster 410. That is, based on the distance threshold, the clustering program 400 can identify a different number of clusters 410 for the input trip vectors 310, 315. The distance threshold can be determined as a maximum distance at which trip vectors 310, 315 that share a common origin 205 and a common destination 210 are assigned to a same cluster 410. The clustering program 400 can then determine a target fuel consumption rate 405 of each cluster 410 based on, e.g., a cumulative distribution function of the respective fuel consumption rates of each trip vector 310, 315 in the cluster 410. The clustering program 400 can thus identify a plurality of clusters 410, each cluster 410 assigned a respective target fuel consumption rate 405.

Next, in a block 625, the server 130 trains a second machine learning program 415 to output operation settings 420 for vehicle components 120. As described above, the second machine learning program 415 can be a neural network such as the DNN 500. The server 130 can train the second machine learning program 415 with the annotated predicted trip vectors 310 and reference fuel consumption rates 405 to output operation settings 420.

Next, in a block 630, the server 130 transmits the first machine learning program 300, the clustering program 400, and the second machine learning program 415 to a computer 110 of a vehicle. Upon training the programs 300, 400, 415, the server 130 can send a message via the network 125 to the computer 110 with the trained programs 300, 400, 415. The computer 110 can store the trained programs 300, 400, 415 in a memory. Following the block 630, the process 600 ends.

Figure 7:
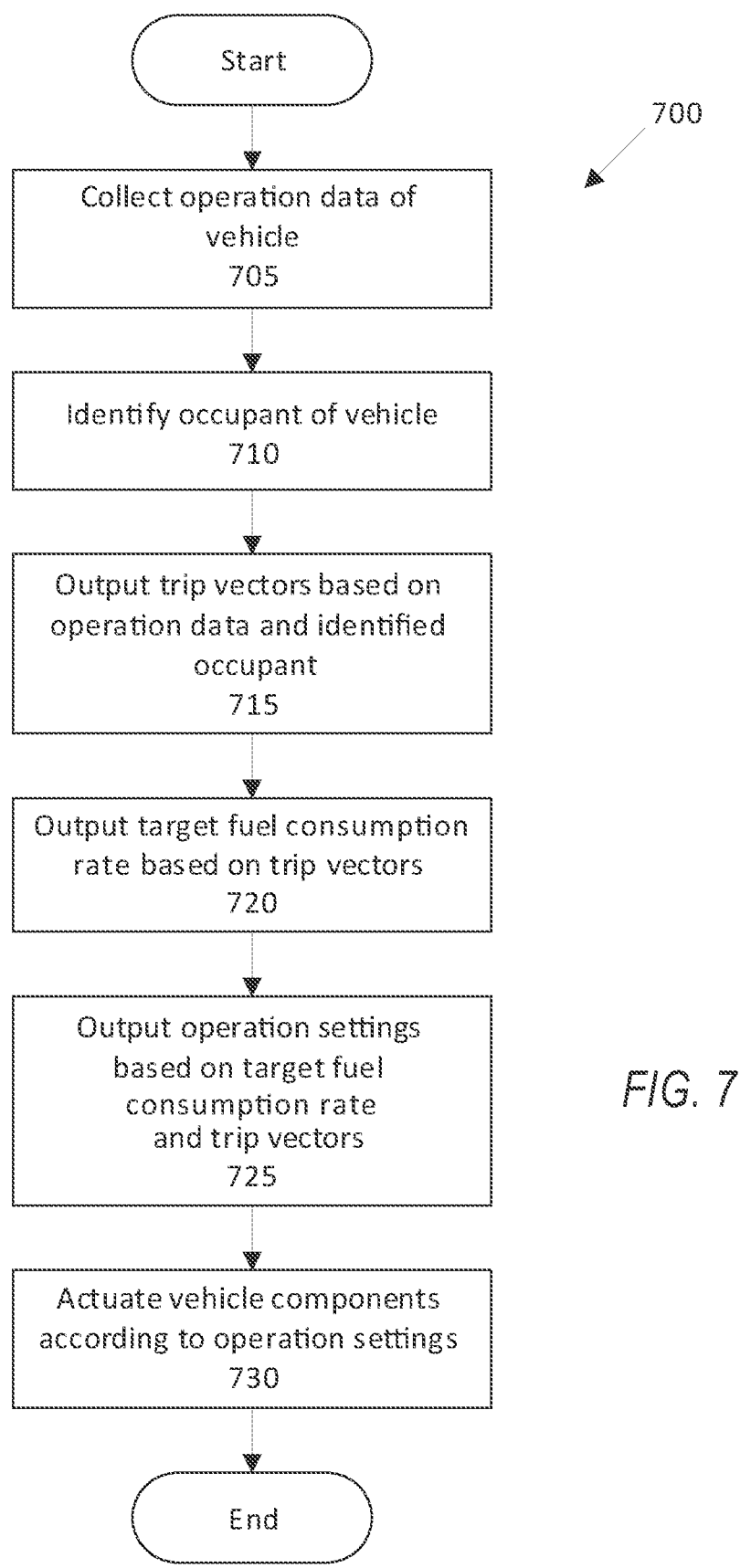
FIG. 7 is a diagram of an example process for operating the vehicle.

FIG. 7 is a diagram of an example process 700 for operating a vehicle 105. The process 700 begins in a block 705, in which a computer 110 collects operation data of the vehicle 105 on a trip 200. As described above, the operation data are data describing operation of the components 120, e.g., speed data, acceleration data, braking data, fuel level data in a fuel tank, fuel consumption data, steering angle data, tire pressure data, etc. That is, as the computer 110 actuates components 120 along the trip 200, the operation data describe how the vehicle 105 operates on the trip 200. The computer 110 can collect the operation data with one or more sensors 115.

Next, in a block 710, the computer 110 identifies an occupant operating the vehicle 105 based on the operation data. As described above, the computer 110 can compare operation data of a current trip 200 (i.e., "current operation data") to previously collected operation and occupant identification data. The computer 110 can identify the occupant when the current operation data are included only in trip data sets 305 of a single occupant of the vehicle 105. The computer 110 can identify the occupant as that single occupant.

Next, in a block 715, the computer 110 and/or a server 130 outputs a predicted trip vector 310 and a plurality of previous trip vectors 315 based the operation data and the identified occupant. The computer 110 can input the operation data, the identified occupant, and previous trip data sets 305 that the identified occupant performed to a machine learning program 300 trained to output a predicted trip vector 310 for a current trip 200 and previous trip vectors 315 for previous trip data sets 305 of the occupant, as described above. The machine learning program 300 can be, e.g., a deep neural network trained with annotated operation data to output a predicted trip vector 310 according to the annotations. Alternatively, the computer 110 can transmit the operation data and the occupant identification data to a server 130 that outputs the predicted trip vector 310 and the previous trip vectors 315 from the machine learning program 300.

Next, in a block 720, the computer 110 and/or the server 130 outputs a target fuel consumption rate 405 based on the predicted trip vector 310 and the previous trip vectors 315. The computer 110 can input the predicted trip vector 310 and the previous trip vectors 315 to a clustering program 400 that assigns the predicted trip vector 310 to one of a plurality of clusters 410, each cluster 410 defined by a plurality of previous trip vectors 315 sharing a common origin 205 and a common destination 210. The clustering program 400 can output the target fuel consumption rate 405 as an output of a cumulative distribution function, as described above, that outputs a target fuel consumption rate 405 that is above the respective fuel economies 405 of a specified number of the previous trip vectors 315 in the cluster 410, e.g., a fuel consumption rate 405 that the respective fuel consumption rate 405 values for 90% of the trip data sets 305 in the cluster 410 are below.

Next, in a block 725, the computer 110 and/or the server 130 inputs the target fuel consumption rate 405 and the predicted trip vector 310 to a second machine learning program 415 to output a plurality of operation settings 420 for components 120 of the vehicle 105. That is, the output operation settings 420 are settings for the components 120 that, when the computer 110 actuates the components 120 according to the output operation settings 420, the vehicle 105 would complete the trip 200 and likely attain the target fuel consumption rate 405. As described above, the second machine learning program 415 can be a deep neural network trained with reference trip vectors 305 annotated with a reference fuel consumption rate 405 and specified operation settings 420. A cost function of the machine learning program 415 can be minimized as described below such that an input trip vector 305 with no annotations output calibration settings 420 to attain the target fuel consumption rate 405. As described above, the operation settings 420 account for data in the trip vector 310, e.g., weather data W, operator aggressiveness data A, etc., to specify operation of the components 120. When the server 130 determines the operation settings 420, the server 130 can transmit the operation settings 420 to the computer 110.

Next, in a block 730, the computer 110 actuates one or more vehicle components 120 according to the output operation settings 420. The computer 110 can instruct the components 120 to actuate according to the specified operation settings 420. For example, the computer 110 can actuate a propulsion to maintain a vehicle speed below a specified vehicle speed. In another example, the computer 110 can actuate a powertrain to maintain a torque output within a threshold of a specified torque output. In another example, the computer 110 can actuate a fuel injector to maintain a fuel consumption within a threshold of a specified fuel consumption rate. Following the block 730, the process 700 ends.

Computing devices discussed herein, including the computer 110, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 110 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 600, one or more of the steps could be omitted, or the steps could be executed in a different order than shown in FIG. 6. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

Ordinal adjectives such as "first" and "second" are used throughout this document as identifiers and are not intended to signify importance or order.

The invention claimed is:

1. A system, comprising a computer including a processor and a memory, the memory storing instructions executable by the processor to:
    collect operation data of one or more components of a vehicle;
    input to a first machine learning program (a) a current trip vector that includes a set of values including a predicted path of the vehicle and one or more current operation settings for the components, (b) the collected operation data, and (c) previously stored operation data;
        wherein the first machine learning program assigns the collected operation data to one of a plurality of previously determined trip vectors that include one of a plurality of previously determined paths,
        assigns the current trip vector to one of a plurality of clusters, wherein each of the plurality of clusters is based on a respective previously determined trip vector including respective predicted paths and respective one or more current operation settings for the components, to determine a predicted trip vector including a further predicted path and further one or more current operation settings for the components, and
        outputs a target fuel consumption rate of the vehicle based on the predicted trip vector and the previously determined trip vectors;
    input the target fuel consumption rate and the collected operation data to a second machine learning program that outputs a plurality of operation settings of the one or more components to attain the target fuel consumption rate; and
    actuate the one or more components to attain the plurality of operation settings.

2. The system of claim 1, wherein the instructions further include instructions to collect the operation data from a predetermined period of time from activation of the vehicle.

3. The system of claim 1, wherein the instructions further include instructions to identify an occupant of the vehicle based on the collected operation data.

4. The system of claim 3, wherein the instructions further include instructions to input the identification of an occupant of the vehicle to the first machine learning program and to output the target fuel consumption rate based on the identification of the occupant.

5. The system of claim 4, wherein the instructions further include instructions to input previously determined operation data of the vehicle operated by the identified occupant to the first machine learning program.

6. The system of claim 1, wherein the instructions further include instructions to input a planned path of the vehicle to the first machine learning program to output the target fuel consumption rate.

7. The system of claim 1, wherein each previously determined trip vector defining the plurality of clusters includes an origin, a destination, and a path between the origin and the destination, and each previously determined trip vector has at least one of a different destination or a different path from each other previously determined trip vector.

8. The system of claim 1, wherein the instructions further include instructions to input the collected operation data and previously stored operation data to a third machine learning program trained to output the trip vector.

9. The system of claim 1, wherein the plurality of operation settings includes a prescribed torque output from a powertrain, and the instructions further include instructions to actuate the powertrain to attain the prescribed torque output.

10. The system of claim 1, wherein the plurality of operation settings includes a prescribed maximum speed, and the instructions further include instruction to actuate at least one of a powertrain, a propulsion, or a brake to operate the vehicle below the prescribed maximum speed.

11. The system of claim 1, wherein the instructions further include instructions to input a current timestamp to the first machine learning program and to output the target fuel consumption rate based on the current timestamp.

12. A method, comprising:
collecting operation data of one or more components of a vehicle;
inputting to a first machine learning program (a) a current trip vector that includes a set of values including a predicted path of the vehicle and one or more current operation settings for the components, (b) the collected operation data, and (c) previously stored operation data;
wherein the first machine learning program assigns the collected operation data to one of a plurality of previously determined trip vectors that include one of a plurality of previously determined paths,
assigns the current trip vector to one of a plurality of clusters, wherein each of the plurality of clusters is based on a respective previously determined trip vector including respective predicted paths and respective one or more current operation settings for the components, to determine a predicted trip vector including a further predicted path and further one or more current operation settings for the components, and
outputs a target fuel consumption rate of the vehicle based on the predicted trip vector and the previously determined trip vectors;
inputting the target fuel consumption rate and the collected operation data to a second machine learning program that outputs a plurality of operation settings of the one or more components to attain the target fuel consumption rate; and
actuating the one or more components to attain the plurality of operation settings.

13. The method of claim 12, further comprising collecting the operation data from a predetermined period of time from activation of the vehicle.

14. The method of claim 12, further comprising identifying an occupant of the vehicle based on the collected operation data.

15. The method of claim 14, further comprising inputting the identification of an occupant of the vehicle to the first machine learning program and to output the target fuel consumption rate based on the identification of the occupant.

16. The method of claim 12, further comprising inputting a planned path of the vehicle to the first machine learning program to output the target fuel consumption rate.

17. The method of claim 12, wherein each previously determined trip vector defining the plurality of clusters includes an origin, a destination, and a path between the origin and the destination, and each previously determined trip vector has at least one of a different destination or a different path from each other previously determined trip vector.

18. The method of claim 12, wherein the plurality of operation settings includes a prescribed torque output from a powertrain, and the method further comprises actuating the powertrain to attain the prescribed torque output.

* * * * *